United States Patent
Yano

[15] 3,638,906
[45] Feb. 1, 1972

[54] CORPORATION COCK FASTENING ARRANGEMENT

[72] Inventor: Shinkichi Yano, 137-1, Sakurazuka Dori, 7-chome, Toyonaka-shi, Osaka-fu, Japan

[22] Filed: May 13, 1969

[21] Appl. No.: 824,166

[52] U.S. Cl. ............................................251/145, 285/220
[51] Int. Cl. ..................................F16k 51/00, F16l 29/00
[58] Field of Search ..............251/145, 146; 285/219, 220, 285/211, 212, 351, 352, 379, 198

[56] References Cited

UNITED STATES PATENTS

| | | | |
|---|---|---|---|
| 2,422,158 | 6/1947 | Wolfram | 285/351 X |
| 2,481,142 | 9/1949 | Mueller et al. | 285/212 |
| 2,919,147 | 12/1959 | Nenzell | 285/220 X |
| 3,458,220 | 7/1969 | Rose et al. | 285/220 |
| 2,199,647 | 5/1940 | Mueller et al. | 285/220 |
| 3,331,622 | 7/1967 | Bagnulo | 285/198 |

FOREIGN PATENTS OR APPLICATIONS

| | | | |
|---|---|---|---|
| 935,359 | 8/1963 | Great Britain | 285/212 |

Primary Examiner—William R. Cline
Attorney—Hall & Houghton

[57] ABSTRACT

The externally threaded portion of the lower part of a corporation cock main body is screwed into a threaded hole bored in a part of a water-service pipe, with an annular packing of highly elastic material interposed under compression between the corporation cock main body and the water-service pipe, the repelling recovering elasticity of said annular packing serving to firm the fastening of the corporation cock to the water-service pipe and prevent leakage of water through the threaded connection.

3 Claims, 4 Drawing Figures

PATENTED FEB 1 1972　　3,638,906

INVENTOR
SHINKICHI YANO

BY Hall & Houghton

ATTORNEY

CORPORATION COCK FASTENING ARRANGEMENT

BACKGROUND OF THE INVENTION

1. Field of the Invention

The present invention relates to a fastening arrangement for fastening a corporation cock to a part of a water-service pipe.

2. Description of the Prior Art

This kind of corporation cock is fastened to a water-service pipe at any desired position thereon in such a manner that a part of the water-service pipe is bored with a threaded hole for receiving the externally threaded portion at the lower end of the corporation cock and said externally threaded portion is then screwed thereinto.

That is to say, by screwing the externally threaded portion in, the corporation cock is fixed to the water-service pipe and at the same time water sealing in the fastened parts is maintained, thereby preventing leakage of water through said parts.

Recently, water-service pipes, however, have come to be produced of cast iron of high strength and good quality such as ductile cast iron, with the result that water-service pipes having a thinner wall thickness than before have come into use. With such water-service pipes of thinner wall thickness, the number of internal threads for the fastening of the corporation cock is necessarily decreased. For example, the threaded hole has only about two or three threads. Therefore, if the corporation cock is fastened thereto, the resulting fastened state is weak and unstable and not only is there a danger of detachment occuring during long use, but also water-sealing is imperfect, thus often causing leakage of water through clearance between the threads.

In order to avoid this, a method has been used in which a saddle band is wound around the entire periphery of the water-service pipe, a threaded hole for receiving the externally threaded portion of the corporation cock is provided in the saddle portion of said saddle band and the externally threaded portion is screwed into the respective threaded holes of the water-service pipe and saddle band. Winding the saddle band around the long circumference and clamping and fixing it in position, however, takes much trouble and decreases the efficiency of operation. Moreover, the costs are high, as the band part is additionally required. Thus, it has fallen to fully meet the requirements for a satisfactory corporation check cock fastening device.

SUMMARY OF THE INVENTION

The present invention provides an improved corporation cock fastening arrangement characterized in that the lower part of a main body is provided with an externally threaded portion smaller in diameter than the main body, said externally threaded portion being screwed into a threaded hole in a water-service pipe through an annular packing of highly elastic rubber, said annular rubber packing being interposed under compression between the pipe and main body, whereby the engagement between the pipe and main body, whereby the engagement between the external and internal threads due to the repelling elasticity of said rubber packing fixes the corporation cock to the water-service pipe and prevents leakage of water through the connection.

BRIEF DESCRIPTION OF THE DRAWINGS

In the drawings showing preferred embodiments of the invention.

DESCRIPTION OF THE PREFERRED EMBODIMENTS

Figure 1:
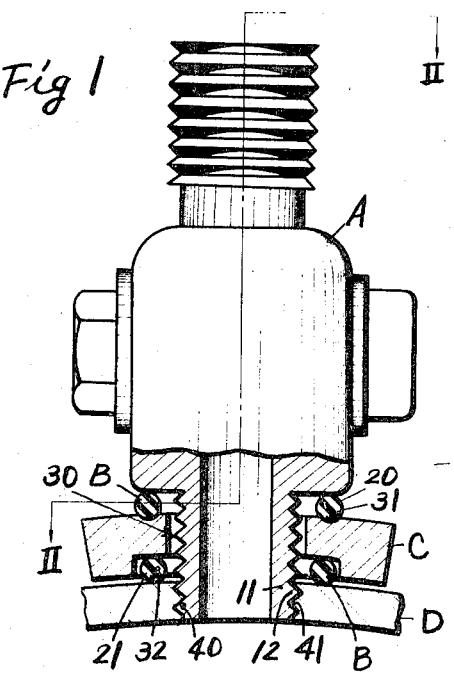
FIG. 1 is a longitudinally sectional side elevation of an arrangement.
Figure 2:
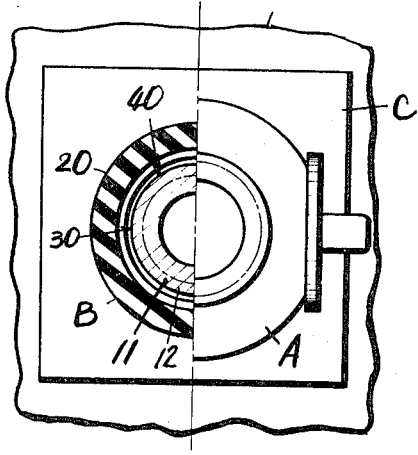
FIG. 2 is a plan view thereof, the left-hand half showing a section taken on the line II—II of FIG. 1.

In a preferred embodiment of the corporation cock arrangement shown in FIGS. 1 and 2, this new invention arrangement comprises a corporation cock (A), highly resilient annular rubber packing means (B), a platelike saddle (C) of such a shape as to cover only the region adjacent the place where the corporation cock is fastened, and a thin walled water-service pipe (D) made of cast iron of high strength and good quality such as ductile cast iron.

Figure 3:
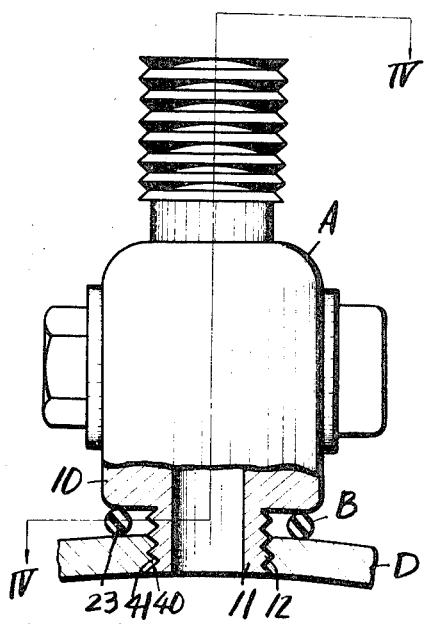
FIG. 3 is a longitudinally sectional side elevation showing a partial modification.
Figure 4:
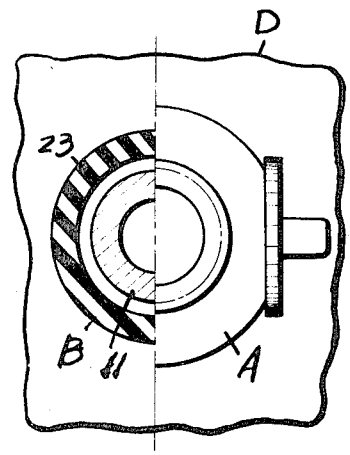
FIG. 4 is a plan view thereof, the left-hand half showing a section taken on the line IV—IV of FIG. 3.

The annular rubber packing means (B) may be interposed directly between the main body (10) of the corporation cock (A) and the water-service pipe (D) without the use of any saddle, as shown in FIGS. 3 and 4, but it is preferable to apply it to either side of the saddle. In the case of FIGS. 1 and 2, two annular rubber packings (20) and (21) are used.

Since the water-service pipe (D) is thin-walled, the number of threads (41) of a threaded hole (40) bored therein is about 2–3.

The saddle (C) is made of metal, hard synthetic resin or the like. The thickness of the saddle (C) is suitably designed depending on the length of the externally threaded portion (11) of the corporation cock (A), the diameter of the cross section of the annular rubber packing (B), and other factors. Further, the size of the saddle is such that is covers only the place where the corporation cock is fastened to the water-service pipe. At the central portion, the saddle (C) is provided with a hole (30) of larger diameter than the external diameter of the threads of the externally threaded portion (11). Further, the saddle (c) is provided on its upper surface with an annular groove (31) in which a part of the thickness of the rubber packing (20) is fitted and on its lower surface with a step portion (32) with which the other annular rubber packing (21) is engaged. Preferably as shown in FIG. 1, at least the surface of the step portion 32 bearing against the packing 21 is laterally curved to correspond to the lateral curvature of the thin walled cylindrical pipe (D). This curvature in the form shown is provided by laterally curving the whole saddle body (C) after formation of step (32) therein, so that it is substantially concentric to the surface of pipe (D), as shown. Further, as shown in FIGS. 1 and 2, the annular groove (31) has its bearing surface parallel to the compressing surface of the corporation cock (A), affording uniform compression of the ring (20) so that it remains annular as shown in FIG. 2, it being understood however, that where the pipe (D) is of relatively large diameter, the compression of the highly elastic packings 20 and 21 will enable the effecting of a seal even though the saddle bearing surfaces are not formed to so uniformly compress the packings (20) and (21), as is illustrated in FIG. 3.

The externally threaded portion (11) of the lower part of the corresponding cock (A) is screwed into the threaded hole (40) of the water-service pipe (D) with the saddle (C) and the two annular rubber packings (20), (21) interposed therebetween, so that the annular rubber packings are fully compressed. The corporation cock (A) is urged upward by the repelling elasticity of the rubber packings (20) and (21), but since the threads (12) on the externally threaded portion (11) are caught by the threads (41) of the threaded hole (40), the corporation cock (A) is stabilized in this condition.

That is to say, the threads (41) of the threaded hole (40) are concerned exclusively with a catching action; it has nothing to do with a water leakage preventive action. Such water leakage preventive action is perfectly achieved by the two upper and lower annular rubber packings (20) and (21).

Further, the corporation cock (A) is urged upward by the repelling elasticity of the annular rubber packings (20) and and as it is frictionally engaged thereby and caught by the threads (12) in the lower region of the externally threaded portion (11), it is so firmly fixed to the water-service pipe (D) that it has no tendency to become accidentally detached therefrom.

A modification shown in FIGS. 3 and 4 uses a single annular rubber packing (23) without the use of any saddle, but this arrangement, too, achieves with thin walled pipes (D) of larger radius the same merit as that shown in FIGS. 1 and 2. Thus, the arrangement shown in FIGS. 3 and 4, is suitable particularly for a corporation cock whose externally threaded portion is short.

It will now be seen from the foregoing that according to the present invention the external threads at the lower end of a corporation cock are caught by the threads of a threaded hole in a water-service pipe and either an annular rubber packing and a saddle or an annular rubber packing alone is interposed under compression, whereby the repelling elasticity of the rubber packing fixes the corporation cock to the water-service pipe; therefore, it is possible to fasten the corporation cock to the water-service pipe firmly and easily, and to prevent leakage of water completely.

While there have been described herein what are at present considered preferred embodiments of the several features of the invention, it will be obvious to those skilled in the art that modifications and changes may be made without departing from the essence of the invention. It is therefore to be understood that the exemplary embodiments thereof are illustrative and not restrictive of the invention, the scope of which is defined in the appended claims, and that all modifications that come within the meaning and range of equivalency of the claims are intended to be included therein.

I claim:

1. A water service installation comprising, in combination,
   a. a corporation cock having a body portion and an externally threaded portion smaller in diameter than said body portion, said body portion having an annular abutment face surrounding said threaded portion,
   b. a thin walled water service pipe having a cylindrical wall with a threaded opening therein threadedly engaged by said threaded portion, said cylindrical wall being of a thickness corresponding to about two to three threads of said threaded portion, and
   c. a packing element surrounding said threaded portion and comprising annular packing means of highly elastic rubbery material sealingly compressed between and in frictional engagement with the cylindrical surface of said thin walled service pipe and the annular abutment surface of said corporation cock for both sealing the installation against leakage and resisting any tendency of said corporation cock to become accidentally detached from said thin-walled pipe, said packing element comprising a saddle and two annular rings of said elastic material, said saddle having a hole therein larger in diameter than the diameter of said threaded portion and through which said threaded portion loosely passes, said annular rubbery rings being compressed between said saddle and the cylindrical surface of said thin walled pipe, and between said saddle and said abutment surface, respectively, and said saddle being of a shape to extend over only a limited region of said pipe surrounding the threaded opening therein, said saddle having an annular groove in the surface thereof facing said abutment shoulder, said annular groove engaging and positioning the annular rubbery ring compressed against said abutment shoulder thereby.

2. An installation as claimed in claim 1, said saddle having at leaSt the surface thereof compressing the rubbery ring against the thin walled pipe curved to be substantially concentric with the adjacent cylindrical surface of said pipe and substantially uniformly compressing said ring against said pipe, and said annular groove having its surface bearing against said ring substantially parallel to said abutment surface for uniformly compressing said ring thereagainst.

3. A water service installation comprising, in combination,
   a. a corporation cock having a body portion and an externally threaded portion smaller in diameter than said body portion, said body portion having an annular abutment face surrounding said threaded portion,
   b. a thin walled water service pipe having a cylindrical wall with a threaded opening therein threadedly engaged by said threaded portion, said cylindrical wall being of a thickness corresponding to about two to three threads of said threaded portion, and
   c. a packing element surrounding said threaded portion and comprising annular packing means of highly elastic rubbery material sealingly compressed between and in frictional engagement with the cylindrical surface of said thin walled service pipe and the annular abutment surface of said corporation cock for both sealing the installation against leakage and resisting any tendency of said corporation cock to become accidentally detached from said thin walled pipe, said packing element comprising a saddle and two annular rings of said elastic material, said saddle having a hole therein larger in diameter than the diameter of said threaded portion and through which said threaded portion loosely passes, said annular rubbery rings being compressed between said saddle and the cylindrical surface of said thin walled pipe, and between said saddle and said abutment surface, respectively, and said saddle being of a shape to extend over only a limited region of said pipe surrounding the threaded opening therein, said saddle having a step portion in the surface thereof facing said thin-walled pipe, said step portion engaging and positioning the rubbery ring compressed against the thin walled pipe thereby.

* * * * *